(12) United States Patent
Bae et al.

(10) Patent No.: US 11,386,873 B2
(45) Date of Patent: Jul. 12, 2022

(54) METHOD AND APPARATUS FOR EFFICIENT APPLICATION SCREEN COMPRESSION

(71) Applicant: Alibaba Group Holding Limited, Grand Cayman (KY)

(72) Inventors: Tae Meon Bae, Hangzhou (CN); Sicheng Li, Hangzhou (CN); Yen-kuang Chen, Hangzhou (CN); Guanlin Wu, Hangzhou (CN); Shaolin Xie, Hangzhou (CN); Minghai Qin, Hangzhou (CN); Qinggang Zhou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/837,656

(22) Filed: Apr. 1, 2020

(65) Prior Publication Data
US 2021/0312891 A1    Oct. 7, 2021

(51) Int. Cl.
*G06T 9/00* (2006.01)
*G09G 5/377* (2006.01)

(52) U.S. Cl.
CPC .............. *G09G 5/377* (2013.01); *G06T 9/00* (2013.01); *G09G 2340/10* (2013.01)

(58) Field of Classification Search
CPC .............. G09G 5/377; G09G 2340/12; G09G 2340/10; G06T 9/00; H04N 11/042; H04N 13/156; H04N 13/161; H04N 13/172; H04N 13/183; H04N 13/194; H04N 21/2343; H04N 21/234318; H04N 21/234345; H04N 21/234327
See application file for complete search history.

(56) References Cited

U.S. PATENT DOCUMENTS

| | | | |
|---|---|---|---|
| 5,392,072 A | 2/1995 | Rodriguez et al. | |
| 6,621,490 B1 * | 9/2003 | Frank ................... | G09G 3/3611 375/E7.1 |
| 6,675,387 B1 | 1/2004 | Boucher et al. | |
| 6,911,987 B1 | 6/2005 | Mairs et al. | |
| 7,072,512 B2 | 7/2006 | Mehrotra | |
| 7,577,301 B1 * | 8/2009 | Wu ........................ | H04N 19/70 382/233 |
| 7,702,171 B2 | 4/2010 | Murai et al. | |
| 8,442,311 B1 * | 5/2013 | Hobbs .................. | H04N 19/187 382/166 |
| 8,549,574 B2 | 10/2013 | Perlman et al. | |

(Continued)

FOREIGN PATENT DOCUMENTS

| | | |
|---|---|---|
| CN | 101420614 A | 4/2009 |
| CN | 101888884 A | 11/2010 |

(Continued)

*Primary Examiner* — Antonio A Caschera

(57) ABSTRACT

A method for of encoding an application screen comprises partitioning graphic data into a plurality of graphic layers and classifying each of the plurality of graphic layers as either a screen content (SC) or a non-screen content (non-SC) layer. The method further comprises classifying each of the plurality of graphic layers as either a screen content (SC) or a non-screen content (non-SC) layer. Further, the method comprises rendering and encoding the one or more SC layers using a first codec and the one or more non-SC layers using a second codec.

14 Claims, 9 Drawing Sheets

(56) References Cited

U.S. PATENT DOCUMENTS

| | | | |
|---|---|---|---|
| 8,782,713 B2 | 7/2014 | Kalva et al. | |
| 8,881,215 B2 | 11/2014 | Perlman et al. | |
| 9,699,468 B2 * | 7/2017 | Guo | H04N 19/463 |
| 9,798,954 B1 * | 10/2017 | Liu | G06K 9/6202 |
| 10,142,520 B1 * | 11/2018 | Gopalakrishnan | H04N 1/642 |
| 10,291,827 B2 | 5/2019 | Ma et al. | |
| 10,432,944 B2 | 10/2019 | Hamilton et al. | |
| 2004/0001634 A1 | 1/2004 | Mehrotra | |
| 2008/0201751 A1 | 8/2008 | Ahmed et al. | |
| 2013/0050254 A1 | 2/2013 | Tran et al. | |
| 2018/0316942 A1 | 11/2018 | Todd | |
| 2018/0316948 A1 | 11/2018 | Todd | |

FOREIGN PATENT DOCUMENTS

| | | | |
|---|---|---|---|
| CN | 102428483 A | 4/2012 | |
| CN | 102428484 A | 4/2012 | |
| CN | 105900432 A | 8/2016 | |
| EP | 2044543 A2 | 4/2009 | |
| KR | 20060027795 A | 3/2006 | |
| KR | 100656645 B1 | 12/2006 | |
| WO | 2007119236 A2 | 10/2007 | |

* cited by examiner

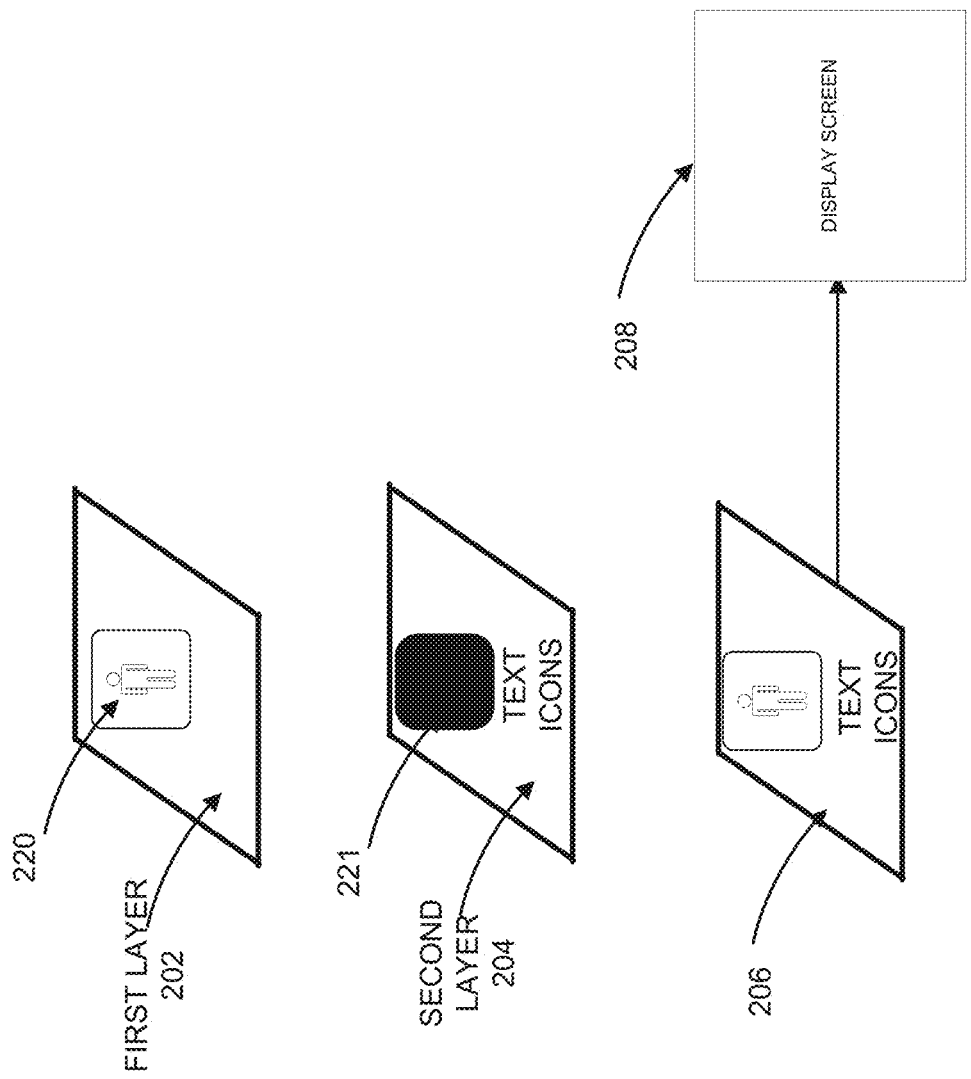

METHOD AND APPARATUS FOR EFFICIENT APPLICATION SCREEN COMPRESSION

FIELD OF THE INVENTION

Embodiments according to the present invention relate to a method for application screen compression.

BACKGROUND OF THE INVENTION

Digital video takes up a significant amount of storage space or bandwidth in its original uncompressed form. Video coding or video compression is the process of compressing (encoding) and decompressing (decoding) video. Video compression makes it possible to transmit or store digital video in a smaller, compressed form. Many video compression standards, including MPEG-2, MPEG-4 and H.264, are well-known in the art today and provide efficient methods to compress video data.

An increasingly important application of video compression is sharing computer display screens or application screens between two or more users at different locations. For example, a user may need to transmit screen data (e.g., for a gaming application) to one or more other users through a network.

Conventionally, virtual network computing systems have been used widely which, in real time, transmit image data displayed on a screen of a personal computer (PC) through a network so that the image data may be displayed on a remote screen display terminal and remotely manipulated from the PC. Further, other types of systems which have been widely used are ones which transmit moving image data in real-time from a PC screen to a screen display terminal by using a wireless LAN so that the data may be displayed there.

Both of these systems are based on a technology for acquiring and compressing a PC image in real time and transmitting it to any other information appliances via a network. Conventionally, such real time transmission of screen image data has involved periodic acquisition and compression of image data of an entire screen, or acquisition and compression of image data of only a changed portion of a screen. The image data has been compressed either by a one-time compression scheme or by a scheme that attempts to compress image data a number of times for each frame using the same coding technique and employs a higher compression ratio.

Typically, on a display screen, a variety of images are displayed, e.g., natural image, or a computer graphic (CG) image. Similarly, on a display screen, different types of videos may be displayed, e.g., either a natural video or a computer-generated video.

Conventionally, compression of a typical application screen or a PC screen display has only involved a single type of compression technique. For example, a conventional H.264 video compression technology (or codec) may be utilized for compressing and distributing all the contents of the display screen. The technique of employing only one compression for the various different types of content on the screen is not efficient. Further, employing a single compression for the entire screen does not result in the highest compression ratio because an appropriate compression scheme cannot be set in such a manner as to accommodate properties of each of the regions of a screen.

BRIEF SUMMARY OF THE INVENTION

Accordingly, a need exists for a test methodology that can address the problems with the systems described above. Using the beneficial aspects of the systems described, without their respective limitations, embodiments of the present invention provide novel solutions to address these problems.

Recently, there has been a proliferation of applications that display more than merely camera-captured content. These applications include displays that combine camera-captured graphics and computer graphics. Screen content (SC) coding has been developed to improve coding efficiency of computer-generated or synthetic content in videos, such as text and UI elements, as opposed to content captured using photographic equipment, for which most video codecs are optimized. Natural videos use conventional video codecs such as Advanced Video Coding (AVC), which is also referred to as H.264 or MPEG-4, and is the most commonly used format for the recording, compression and distribution of video content. Conventional video codecs, e.g., H.264, High Efficiency Video Coding (HEVC) are not able to encode screen content efficiently. Extensions to HEVC, e.g., HEVC Screen Content Coding (SCC), are proposed but not widely adopted yet.

In order to support compression and transmission of application screens comprising both screen content and natural video, embodiments of the present invention employ a hybrid approach wherein different coding techniques are utilized for coding different areas or layers of the video. In other words, different coding techniques are utilized to create computer generated video for an application or a display screen, wherein the type of coding technique chosen depends on whether the content being encoded is standard video or screen content. Different areas or layers comprising a display screen may be more efficiently encoded using different respective types of coding, e.g., screen content coding or natural video coding. Encoding different graphic layers of the video using different coding techniques advantageously results in significant improvements in compression efficiency over a coding system that focuses on techniques used primarily for camera-captured natural content. Further, significantly higher compression is achievable with a hybrid tool that encodes natural video layers using different codecs than screen content layers.

In one embodiment, graphic layers that may be characterized as screen content layers are treated separately from graphic layers that may be characterized as natural video layers. In an embodiment, the screen content layers may be rendered using an encoding scheme that is particularly suited for SC, e.g., Portable Network Graphics (PNG), HEVC-SCC extension, Quick-time animation, etc. By comparison, conventional systems simply stream the screen content regions to the end-user as a conventional video. In one embodiment, the screen content is rendered at the user device subsequent to transmission by streaming graphics commands, e.g., by transmitting Open Graphics Library (OpenGL) or DirectX commands used to render the SC layers.

In an embodiment, graphics layers that cannot be characterized as SC layers (e.g., because they do not satisfy particular SC-related characteristics) can be encoded efficiently with conventional codecs optimized for natural videos, e.g., H.264, HEVC, VC1, etc.

In one embodiment, a computer-implemented method of encoding an application screen is disclosed. The method comprises partitioning graphic data into a plurality of graphic layers and classifying each of the plurality of graphic layers as either a screen content (SC) or a non-screen content (non-SC) layer. The method further comprises classifying each of the plurality of graphic layers as either a screen content (SC) or a non-screen content (non-SC) layer.

Further, the method comprises rendering and encoding the one or more SC layers using a first codec and the one or more non-SC layers using a second codec.

In another embodiment, a system for performing a method of encoding an application screen is disclosed. The system comprises a memory and a processing device communicatively coupled with the memory. The processing device is configured to: a) partition graphic data into a plurality of graphic layers; b) classify each of the plurality of graphic layers as either a screen content (SC) or a non-screen content (non-SC) layer; c) group one or more SC layers into a first group and grouping one or more non-SC layers into a second group; and d) render and encode the first group using a first codec and the second group using a second codec.

In a different embodiment, a non-transitory computer-readable storage medium having stored thereon, computer executable instructions that, if executed by a computer system cause the computer system to perform a method of encoding an application screen is disclosed. The method comprises partitioning graphic data into a plurality of graphic layers. The method further comprises classifying each of the plurality of graphic layers as either a screen content (SC) or a non-screen content (non-SC) layer. Further, the method comprises rendering and encoding the one or more non-SC layers using a codec and transmitting the encoded one or more non-SC layers to a destination device. Finally, the method comprises streaming rendering commands associated with the one or more SC layers to the destination device.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 2B illustrates the manner in which a natural video layer may be combined with a SC layer to create a composite output image in accordance with an embodiment of the present invention.

Figure 1:
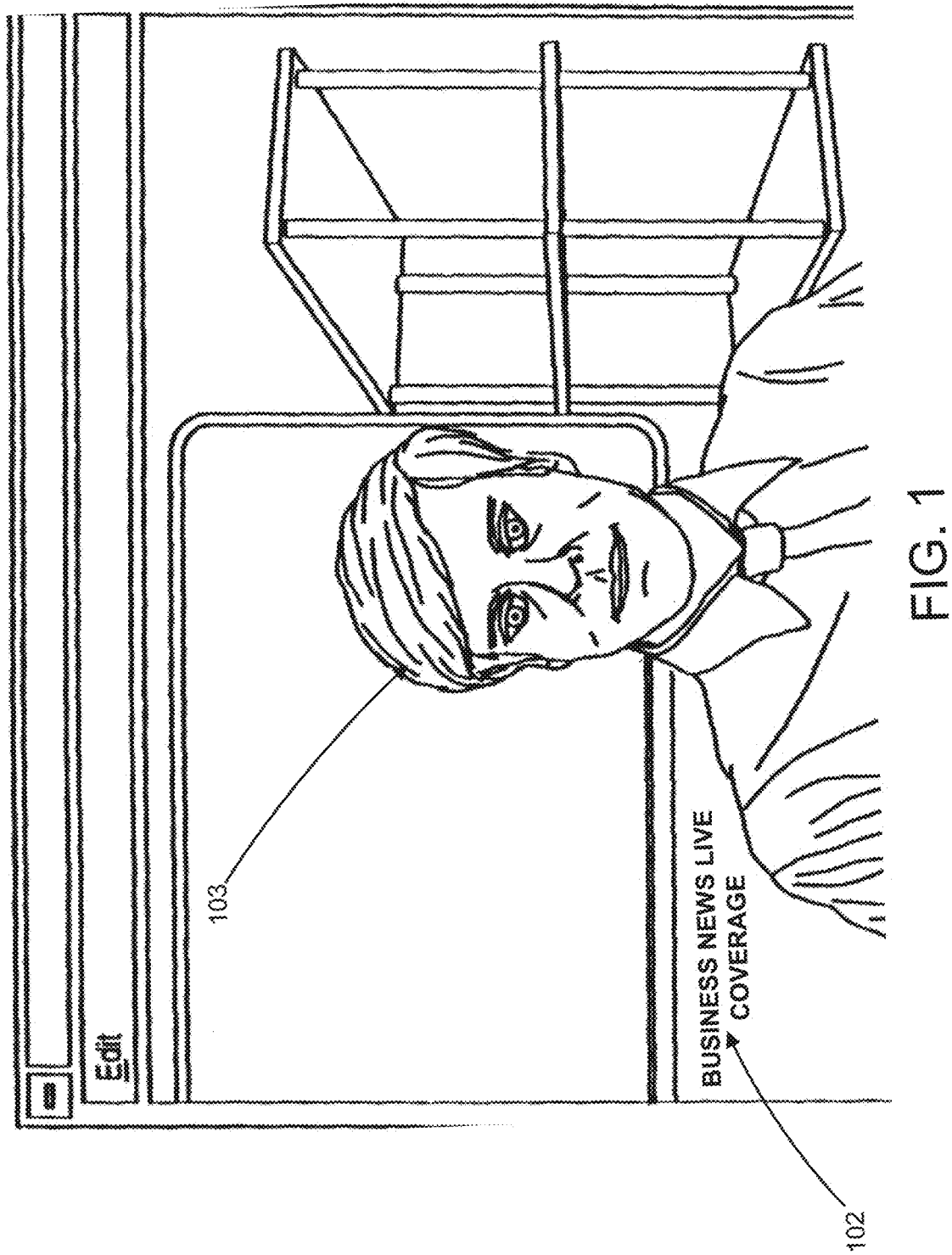
FIG. 1 illustrates an exemplary application screen image that comprises a combination of both screen content and natural video content.

In the figures, elements having the same designation have the same or similar function.

DETAILED DESCRIPTION OF THE INVENTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Notation and Nomenclature Section

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "classifying," "separating," "grouping," "rendering," "receiving," "combining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The description below provides a discussion of computers and other devices that may include one or more modules. As used herein, the term "module" or "block" may be understood to refer to software, firmware, hardware, and/or various combinations thereof. It is noted that the blocks and modules are exemplary. The blocks or modules may be combined, integrated, separated, and/or duplicated to support various applications. Also, a function described herein as being performed at a particular module or block may be performed at one or more other modules or blocks and/or by one or more other devices instead of or in addition to the function performed at the described particular module or block. Further, the modules or blocks may be implemented across multiple devices and/or other components local or remote to one another. Additionally, the modules or blocks may be moved from one device and added to another device, and/or may be included in both devices. Any software implementations of the present invention may be tangibly embodied in one or more storage media, such as, for example, a memory device, a floppy disk, a compact disk (CD), a digital versatile disk (DVD), or other devices that may store computer code.

The terminology used herein is for the purpose of describing particular embodiments only and is not intended to limit the scope of the present invention. As used throughout this disclosure, the singular forms "a," "an," and "the" include plural reference unless the context clearly dictates otherwise. Thus, for example, a reference to "a module" includes a plurality of such modules, as well as a single module, and equivalents thereof known to those skilled in the art.

A Hybrid Approach for Efficient Application Screen Compression

Recently, there has been a proliferation of applications that display more than just camera-captured content. These applications include displays that combine camera-captured and computer graphics, wireless displays, tablets as second display, control rooms with high resolution display wall, digital operation room (DiOR), virtual desktop infrastructure (VDI), screen/desktop sharing and collaboration, cloud computing and gaming, factory automation display, supervisory control and data acquisition (SCADA) display, automotive/navigation display, PC over IP (PCoIP), ultra-thin client, remote sensing, etc. The type of video content (also known as "screen content") used in these applications can contain a significant amount of stationary or moving computer graphics and text, along with traditional camera-captured content. However, unlike camera-captured content, screen content frequently contains no sensor noise, and such content may have large uniformly flat areas, repeated patterns, high contrast and sharp edges, highly saturated or a limited number of different colors, and numerically identical blocks or regions among a sequence of pictures.

Screen content (SC) coding is used to improve coding efficiency of synthetic content in videos, such as text and UI elements, as opposed to content captured using photographic equipment, for which most video codecs are optimized. Natural videos use conventional video codecs such as Advanced Video Coding (AVC), which is also referred to as H.264 or MPEG-4 and is the most commonly used format for the recording, compression and distribution of video content. Conventional video codecs, e.g., H.264, High Efficiency Video Coding (HEVC) are not able to encode screen content efficiently. Extensions to HEVC, e.g., HEVC Screen Content Coding (SCC) are proposed but not widely adopted yet.

Screen content, as typified by the computer and mobile display content, has recently emerged as a popular video type due to the fast-rising demands for transporting or storing screen visuals in the form of video. This is driven partly by rapid advances in mobile, cloud, and display technologies. In inter-device-oriented applications sending screen text and graphics as video data enables platform-independent rendering, making easy exchange of screen content between devices and across platforms possible. However, screen content type video poses numerous challenges. As noted above, screen content has certain signal characteristics that make it difficult to compress using the conventional methods designed to code camera-captured content. For example, screen content often features computer-generated objects, text, and line art, which are discrete-tone and full of sharp edges. The loss of few high-frequency components due to compression can make text illegible and thin lines smeared. Camera-captured video commonly constitutes a portion or portions of such content.

FIG. 1 illustrates an exemplary application screen image that comprises a combination of both screen content and natural video content. As shown in FIG. 1, an application screen may comprise both screen content 102 and natural video content 103. Screen content is typically computer-generated content and contains graphics, text, and animations unlike camera-captured content. Screen content is typically used in applications such as desktop sharing, video conferencing, social networks, gaming and remote education. As compared with screen content, natural video content 103 uses a wide range of colors to represent video content, contains more noise due to smooth edges, and pattern repetition is less likely to occur. Screen content, on the other hand, tends to contain a limited number of colors and contains less noise while the edges tend to be much sharper. Further, repetitive patterns can typically be observed in screen content. For example, repetitive patterns may be observed with English characters, logos, etc.

With the rapid development of communication, screen content takes a large portion of the network bandwidth of transmission in addition to natural camera captured data. As noted above, screen content also has additional attributes such as text, shape and graphics comprising uniformly flat regions and repeated patterns, high contrast and sharp edges. Accordingly, coding techniques that are used typically for natural videos cannot provide the best coding efficiency for screen content. Thus, the properties of screen content require a different coding technique other than the ones used for natural videos.

In order to support compression and transmission of application screens comprising both screen content and natural video, embodiments of the present invention employ a hybrid approach wherein different coding techniques are utilized for coding different areas or layers of the video. In other words, different coding techniques are utilized to create computer generated video for an application or a display screen, wherein the type of coding technique chosen depends on whether the content being encoded is standard video or screen content. Different areas or layers comprising a display screen may be more efficiently encoded using different respective types of coding, e.g., screen contents coding or natural video coding. Encoding different graphic layers of the video using different coding techniques advantageously results in significant improvements in compression efficiency over a coding system that focuses on techniques used primarily for camera-captured natural content. Further, significantly higher compression is achievable with a hybrid tool that encodes natural video layers using different codecs than screen content layers.

In one embodiment, graphic layers that may be characterized as screen content layers are treated separately from graphic layers that may be characterized as natural video layers. In an embodiment, the screen content layers may be rendered using an encoding scheme that is particularly suited for SC, e.g., Portable Network Graphics (PNG), HEVC-SCC extension, Quick-time animation, etc, as compared with conventional methods which simply streamed the screen content regions to the end-user as a conventional video. In one embodiment, the screen content is rendered at the user device subsequent to transmission by streaming graphics commands, e.g., by transmitting Open Graphics Library (OpenGL) or DirectX commands used to render the SC layers.

In an embodiment, graphics layers that cannot be characterized as SC layers (e.g., because they do not satisfy particular SC-related characteristics) can be encoded efficiently with conventional codecs optimized for natural videos, e.g., H.264, HEV C, VC1, etc.

Figure 2A:
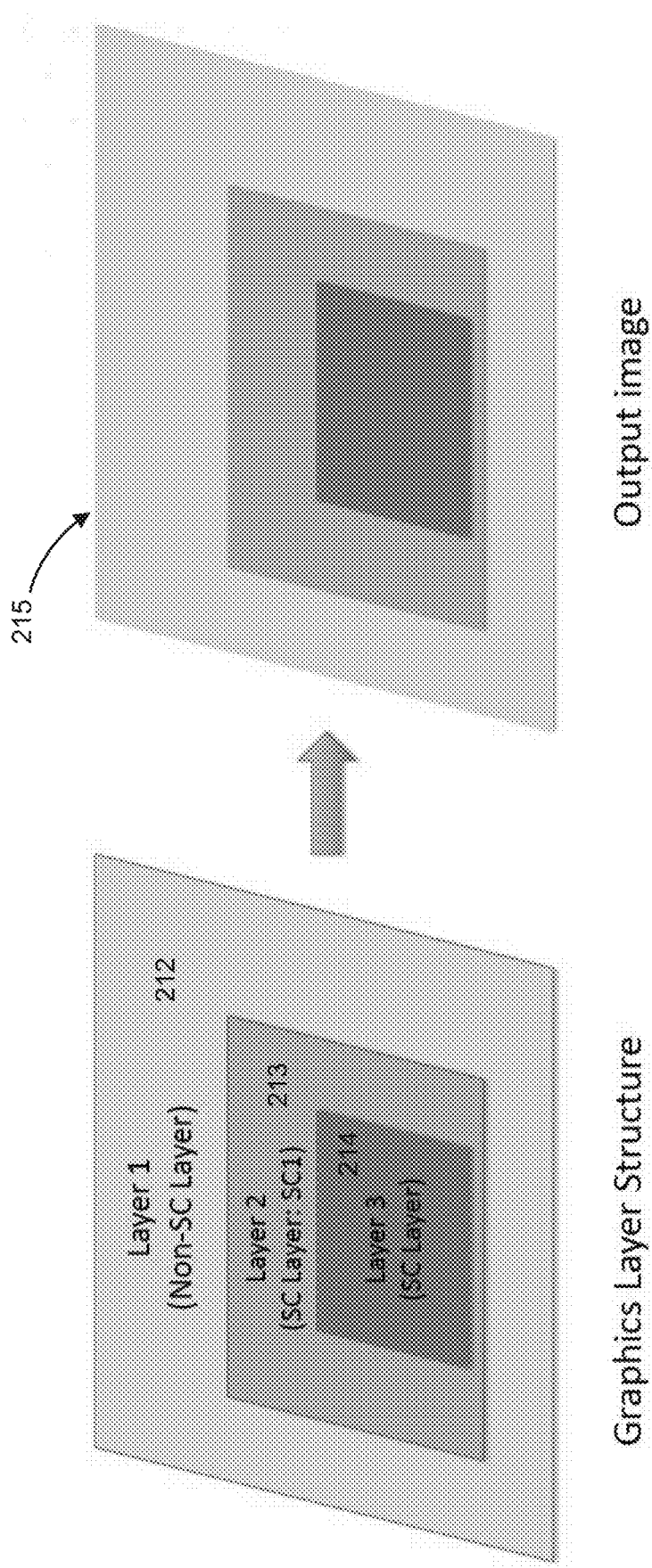
FIG. 2A illustrates the manner in which graphics layers may be characterized in accordance with their respective characteristics and combined to create a composite output image in accordance with an embodiment of the present invention.

FIG. 2A illustrates the manner in which graphics layers may be characterized in accordance with their respective characteristics and combined to create a composite output image in accordance with an embodiment of the present invention.

An application screen may be composed using several graphics layers. Each layer may be projected onto or combined with one or more other layers. For example, an application screen may comprise one or more application layers that are composed of texts and icons. The application layers may, for example, possess the characteristics of SC layers. Combined with the SC layers using, for example, alpha blending, there may be one or more natural video layers (e.g., non-SC layers). Stated differently, the natural video layers are combined with the SC layers using a technique for combining the two types of layers, e.g., a liner combination using alpha blending. It should be noted that there may be several other ways to combine the SC layers with the natural video layers.

As shown in FIG. 2A, a non-SC Layer 212 (e.g., a natural video layer) may be combined with one or more SC layers, e.g., Layer 2 213 and Layer 3 214. Layer 2 213 may for example correspond with a text layer while Layer 3 214 may correspond with an icon layer. Both Layer 2 213 and Layer 3 214 may be characterized as SC layers, however, based on their respective characteristics. The three graphics layers may be combined to create an output image 215. If alpha blending is used to combine the layers, the alpha values will typically determine which of the layers will be superimposed over the other layers in the layer structure.

FIG. 2B illustrates the manner in which a natural video layer may be combined with a SC layer to create a composite output image in accordance with an embodiment of the present invention. A first layer 202 comprising natural video may be combined with a second layer 204 to create a resulting image 206 that is then displayed on a display screen 208. Assuming alpha blending is used to combine the layers, the following equation may be used to determine whether a region 220 of the first layer 202 or a corresponding region 221 of the second layer 204 is displayed on screen 208: alpha*first_layer+(1-alpha)*second_layer.

For example, if the alpha value associated with region 220 is equal to 1, then the resulting image 206 will display region 220 while region 221 may not be rendered in the resulting image 206 because the alpha values corresponding to region 221 may be zero. Stated differently, region 220 with an alpha value of 1 will be rendered in the resulting image 206 to the exclusion of a different region from another layer with a corresponding alpha value of 0. Region 220 is simply not rendered because the alpha values corresponding to region 220 are 0.

In a different embodiment, region 221 may also be rendered for the resulting image 206, however, based on the alpha values, region 220 may be superimposed onto region 220 in a way such that only region 220 is visible in the resulting image 206. Stated differently, both regions 220 and 221 may be rendered separately, however, in the final image rendered for resulting image 206, only region 220 is shown on the display screen 208 because region 220 is superimposed on top of region 221.

As noted above, in one embodiment, layers characterized as SC layers may be encoded using a different coding technique from layers characterized as natural video layers. In other words, the codec used to encode SC layers (e.g., HEVC-SCC) will be different from the codec used to encode natural video (e.g., H.264) layers in order to attain efficient compression. In this way compression efficiency is advantageously attained and computer technology pertaining to application screen compression is improved by applying compression methods adoptively depending on the characteristics of graphics layers. Further, the visual quality of the application screen rendered at the destination device is enhanced because the sharp edges and complex textures such as text are well preserved by using SC-specific encoding methods or graphics streaming.

Figure 3A:
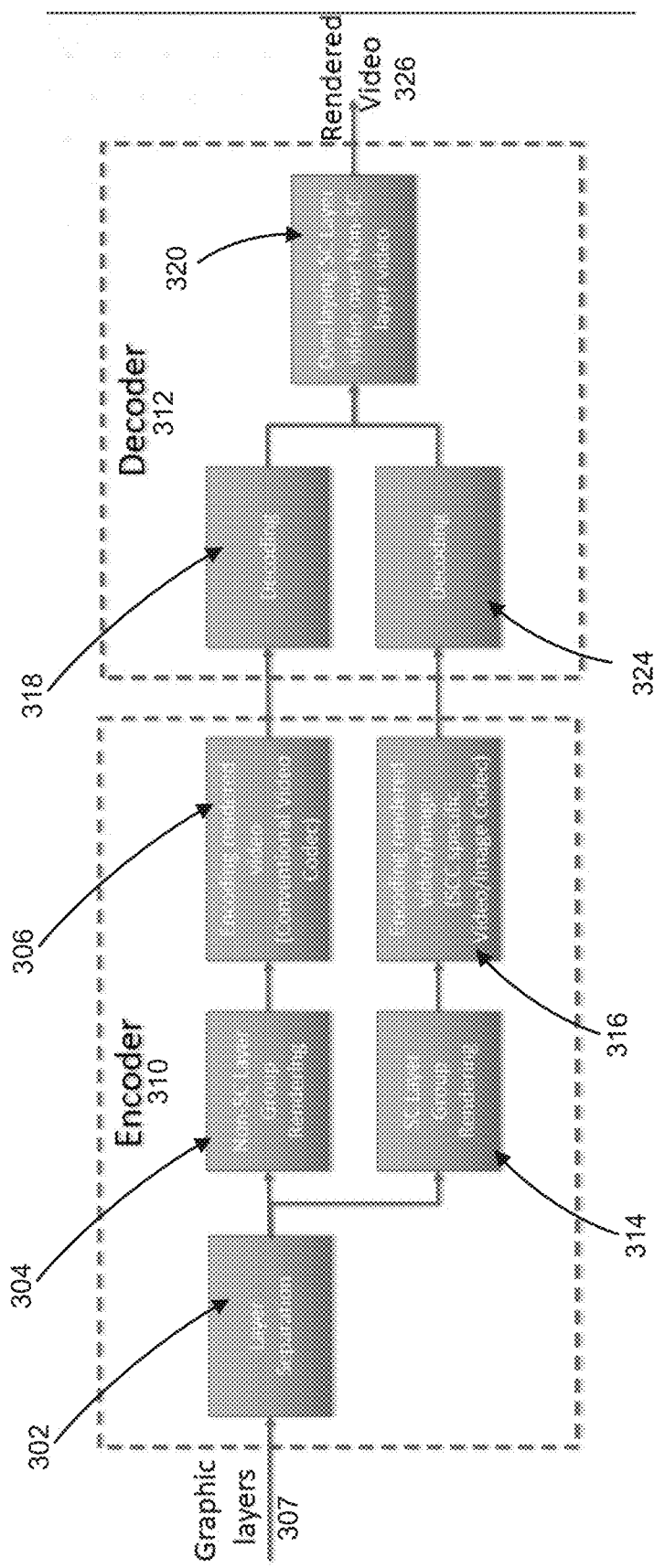
FIG. 3A is a flow diagram illustrating the manner in which graphics layers may be extracted from raw graphics data, and characterized and rendered in accordance with their respective characteristics in an encoder prior to streaming in accordance with an embodiment of the present invention.

FIG. 3A is a flow diagram illustrating the manner in which graphics layers may be extracted from raw graphics data, and characterized and rendered in accordance with their respective characteristics in an encoder prior to streaming in accordance with an embodiment of the present invention.

In one embodiment, when raw graphics data is received at an encoder 310 (FIG. 3A) from a processor or a memory associated with a processor (not shown), the data is classified into SC layers and non-SC layers. In one exemplary classification, layers classified as non-SC layers may be designated with identifiers or classifiers indicating smaller layer depths than layers classified as SC layers. In this exemplary classification, when graphics layers 307 are received at an encoder 310, in order to separate out the SC layers from the non-SC layers, a layer separation module 302 can find the smallest layer depth of a SC layer which is higher than those of all non-SC layers, and mark this layer as SC1. Referring back to FIG. 2A, layer 213 would be marked as layer SC1 in this example. Thereafter, SC layers that have layer depths larger than SC1 are included in the SC layer group, and the other layers are included in the non-SC layer group. Referring to FIG. 2A again, Layer 3 214 is included in the SC layer group while Layer 1 212 is included in the non-SC layer group.

It should be noted that other ways of classifying the various layers may also be possible. For example, in one exemplary classification, layers classified as non-SC layers may be designated with classifiers indicating higher layer depths than layers classified as SC layers. In this embodiment then, the natural video layers (non-SC layers) will have higher layer depths as compared with the SC layers. Referring to FIG. 2B for example, the first layer 202 is a natural video layer that is shown as having a higher layer depth as compared to the second layer 204 which is a SC layer.

Note then than in a typical application, the natural video layer will not have a layer depth that is in between an of the SC layers. Depending on the separation technique employed by layer separation module 302 then, the natural video layer may either have a higher layer depth classification than the SC layers or a lower layer depth classification than the SC layers. In either case, encoder 310 will typically be able to separate out the layer groups efficiently based on layer depth.

In one embodiment, layer separation performed by layer separation module 302 may be based on classifiers generated by machine learning methods, e.g., support vector machines, Bayesian, or deep neural network classifiers. In other words, machine learning may be employed to classify the layers as SC-layers and non-SC layers.

Machine learning is the umbrella term for computational techniques that allows models learn from data rather than following strict programming rules. Machine learning algorithms build a mathematical model based on sample data, known as "training data," in order to make predictions or decisions without being explicitly programmed to perform the task. Machine learning includes using several different types of models including artificial neural networks (ANNs), deep learning methods, etc.

Artificial neural networks (ANN) are computing systems that are inspired by, but not identical to, biological neural networks that constitute animal brains. Such systems "learn" to perform tasks by considering examples, generally without being programmed with task-specific rules. Other types of neural networks include recurrent neural networks (RNN), convolutional neural networks (CNNs), deep belief networks, etc. Some neural networks comprise multiple layers that enable hierarchical feature learning. Deep learning (also known as deep structured learning or hierarchical learning) is part of the broader family of machine learning methods based on ANNs. Deep learning describes learning that includes learning hierarchical features from raw input data and leveraging such learned features to make predictions associated with the raw input data. Any of these different types of networks may be employed by layer separation module 302 to perform the classification.

In one embodiment, layers are separated based on the characteristics of respective layers. For example, SC layers have different characteristics than non-SC layers. As mentioned previously, SC layers may, for example, be characterized by large uniformly flat areas, limited number of colors, existence of texts and number of characters, etc. Further, the types of rendering commands used to render each type of layer may be different. For example, SC layers may have rendering commands, e.g., render box, render text, render button, etc., that are different from rendering commands for non-SC layers, e.g., render pixel, etc. In one embodiment, machine learning may aid in classification performed based on the characteristics of the respective layers. Also, machine learning may be used to perform classification based on the rendering commands used to render respective layers.

Note that in different embodiments, other techniques for separating out the layers may also be utilized by layer separation module 302.

After the layers have been classified by layer separation module 302, the non-SC layers are grouped and rendered by module 304 while the SC-layers are grouped and rendered by module 314. Thereafter, the non-SC layers are encoded by module 306 using conventional video codecs, e.g., H.264, HEVC. Meanwhile, the SC layers are encoded by module 316 using SC-specific codecs, e.g., HEVC-SCC, PNG, Quicktime animation, etc. The operation of module 316 and module 306 for a same video frame may be concurrent or sequential.

At the decoder 312, which may be within a client's device, a respective decoding module is used to decode the SC-layer and non-SC layer transmission. For example, decoder module 318 is used to decode the compressed natural video while decoder module 324 is used to decode the compressed screen content transmission.

Module 320 may then, based on, for example, alpha blending, determine how to combine the natural video layers with the SC layers to create a composite video 326 that is rendered on a display screen (not shown). In one embodiment, a determination is made at the encoder 310 regarding whether there are any layers within the graphics layers 307 that are not transparent and overlay the other layers. If there is, for example, a higher graphic layer that is not transparent (e.g. transparency or alpha is equal to 1), and the relative lower graphic layers cannot be seen, there is no need to encode the unseen regions.

Referring to FIG. 2B for example, if a determination can be made ahead of time that region 220 will overlay region 221 in the final rendered image, the encoding process can be made more efficient by simply not encoding region 221 at all. Referencing FIG. 3 again, this determination may be made, for example, by modules 306 and 316, or by modules 304 and 314.

In this embodiment, the regions that will not be represented on the display screen because they are overlaid by other non-transparent layers are simply not encoded prior to transmission. For example, if SC layers with an alpha channel value of 1 overlay certain non-SC layers, prior to transmission, the pixel values of the respective overlaid non-SC regions within the non-SC layers may be set to 0 and encoded using intra-block copy prediction. Alternatively, the corresponding regions in the non-SC layers may be encoded as skipped blocks for P and B frames.

Figure 3B:
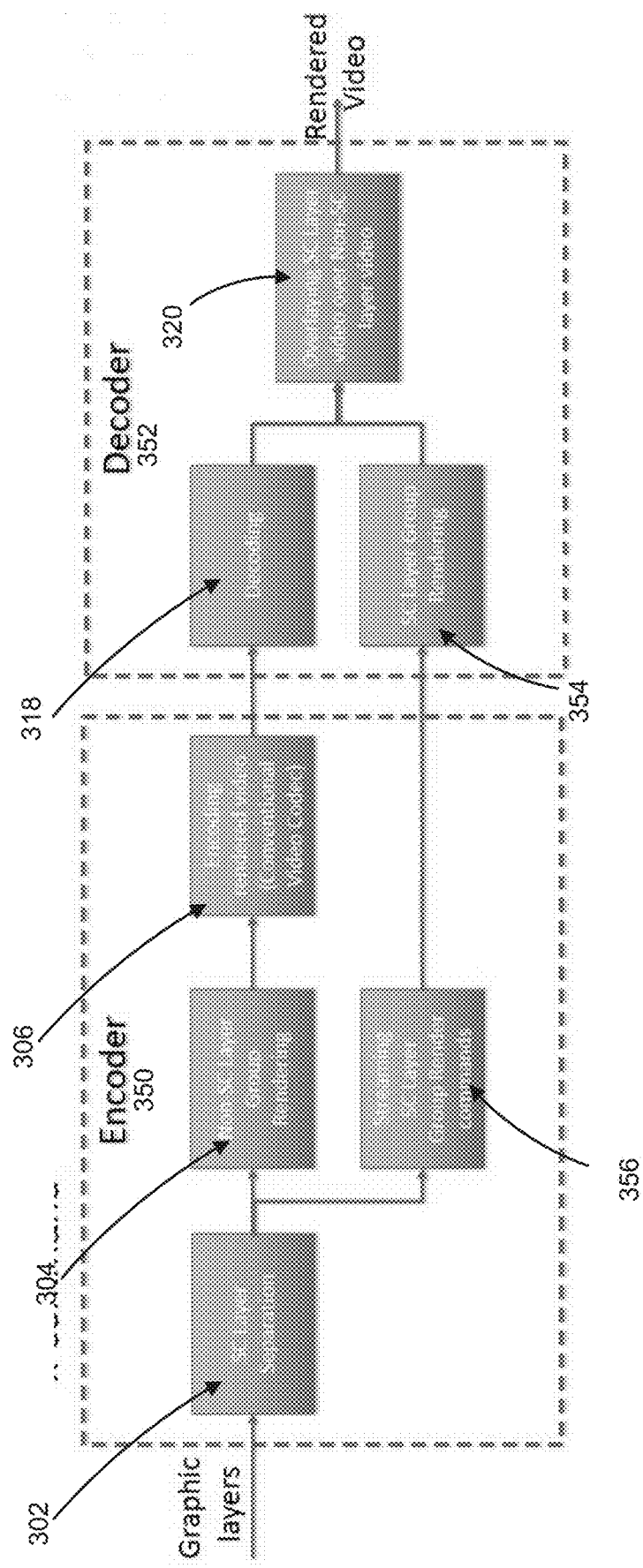
FIG. 3B is a flow diagram illustrating the manner in which non-SC layers may be rendered and encoded for video streaming while SC layers may be transmitted using graphic streaming in accordance with an embodiment of the present invention.

FIG. 3B is a flow diagram illustrating the manner in which non-SC layers may be rendered and encoded for video streaming while SC layers may be transmitted using graphic streaming in accordance with an embodiment of the present invention. As noted previously, in one embodiment, the screen content is transmitted using streaming graphics commands (e.g., by transmitting Open Graphics Library (OpenGL) or DirectX commands used to render the SC layers) and rendered at the user device subsequent to transmission.

Similar to FIG. 3A, the encoder 350 comprises an SC layer separation module 302, a non-SC layer group rendering module 304, an encoding rendered video module 306, while the decoder 352 comprises a decoding module 318 for non-SC layer videos and a layer combination module 320. The non-SC layers are grouped, encoded and decoded in a way that is similar to the one indicated in FIG. 3A. However, in the flow diagram of FIG. 3B, instead of rendering the SC layers, the graphic rendering commands associated with the SC layers are grouped by module 356 and transmitted to the decoder 352. The streaming graphic commands may comprise OpenGL or DirectX commands. At the decoder 352, module 354 renders the SC layers using the graphic commands before conveying the rendered layers to module 320.

Figure 4:
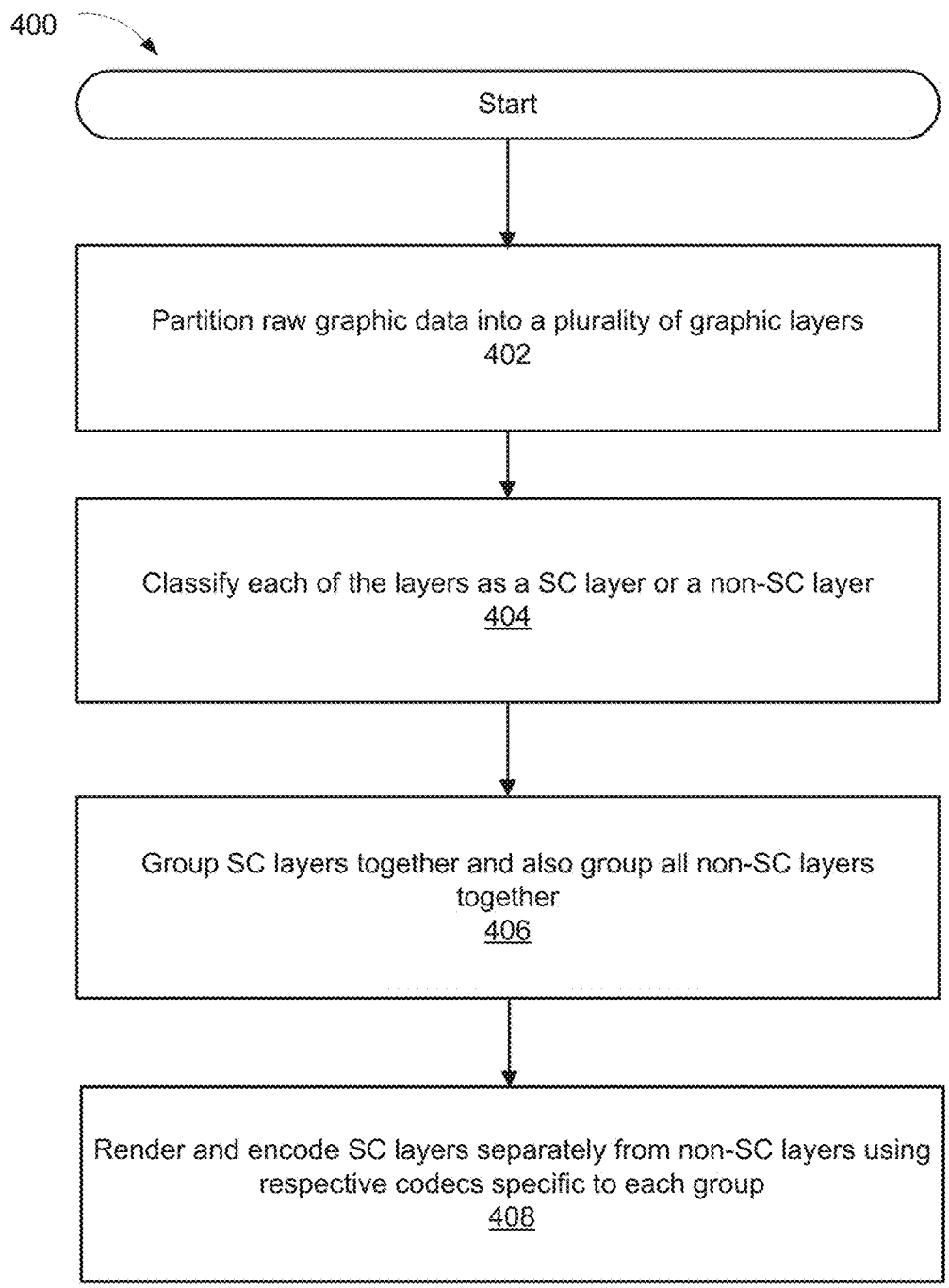
FIG. 4 depicts a flowchart illustrating an exemplary computer-implemented process for efficiently encoding an application screen using a hybrid combination of SC layer and non-SC layer encoding techniques in accordance with an embodiment of the present invention.

FIG. 4 depicts a flowchart 400 illustrating an exemplary computer-implemented process for efficiently encoding an application screen using a hybrid combination of SC layer and non-SC layer encoding techniques in accordance with an embodiment of the present invention.

At step 402, raw graphic data received, or otherwise access from a graphics processing device or an associated memory is retrieved and partitioned into a plurality of graphic layers.

At step 404, each of the layers is classified as an SC layer or a non-SC layer using one of several methods detailed previously.

At step 406, all the SC layers are grouped together and, further, all the non-SC layers are also separately grouped together.

At step 408, the group of SC layers is rendered and encoded for transmission separately from the group of non-SC layers using respective codecs that are appropriate to each group, wherein both groups are decoded at the destination device using respective decoders and combined into a composite rendered video.

Figure 5:
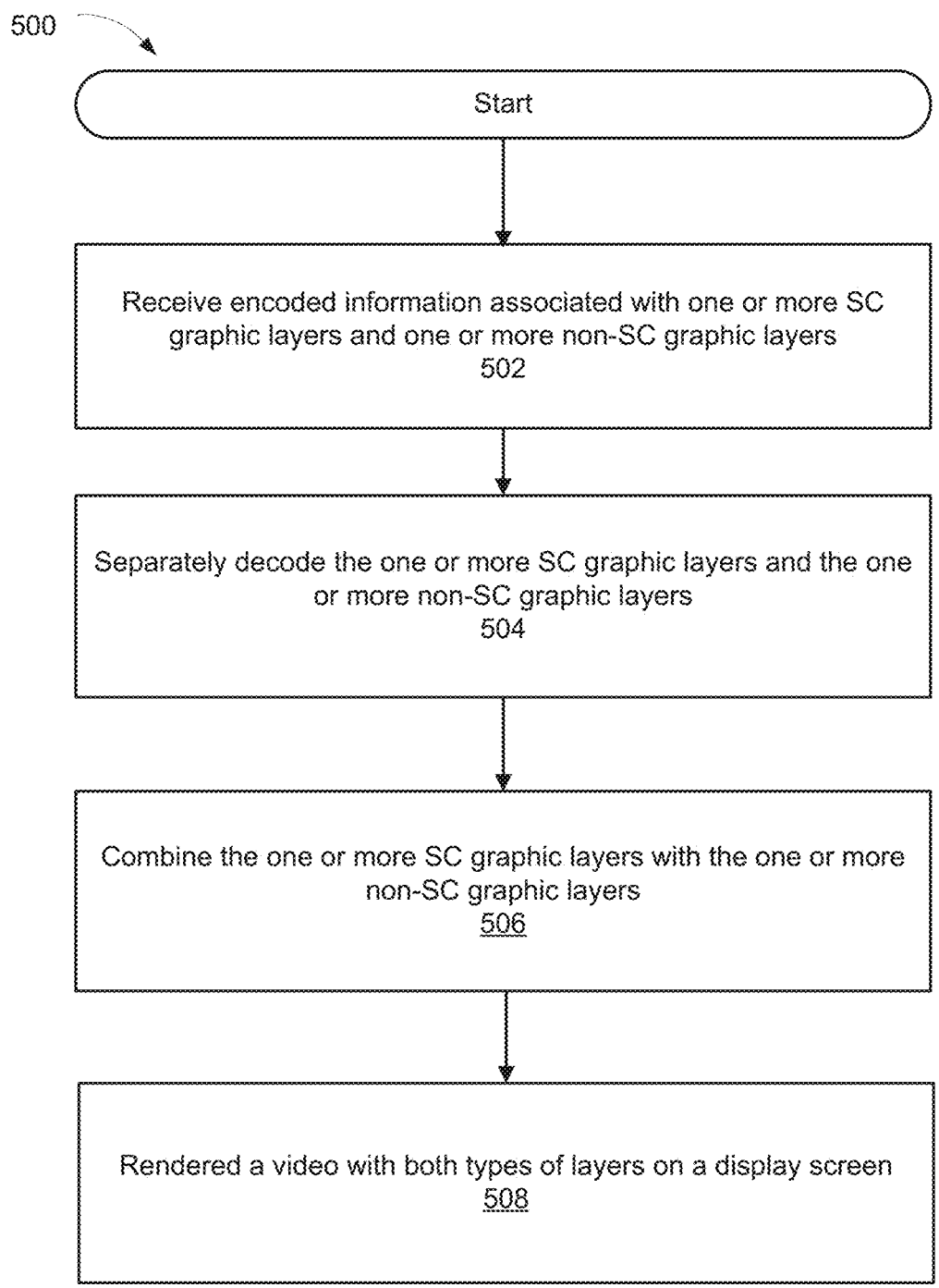
FIG. 5 depicts a flowchart illustrating an exemplary computer-implemented process for efficiently decoding an application screen using a hybrid combination of SC layer and non-SC layer decoding techniques and combining the layers in accordance with an embodiment of the present invention.

FIG. 5 depicts a flowchart illustrating an exemplary computer-implemented process 500 for efficiently decoding an application screen using a hybrid combination of SC layer and non-SC layer decoding techniques and combining the layers in accordance with an embodiment of the present invention.

At step 502, encoded information is received associated with one or more SC graphic layers and, separately, encoded information is received associated with one or more non-SC layers.

At step 504, respective decoders are used to decode the one or more SC graphic layers and the one or more non-SC layers.

At step 506, the one or more SC graphic layers and the one or more non-SC graphic layers are combined by using one of several methodologies, e.g., alpha blending.

At step 508, a video is rendered using the combined SC and non-SC graphic layers.

Figure 6:
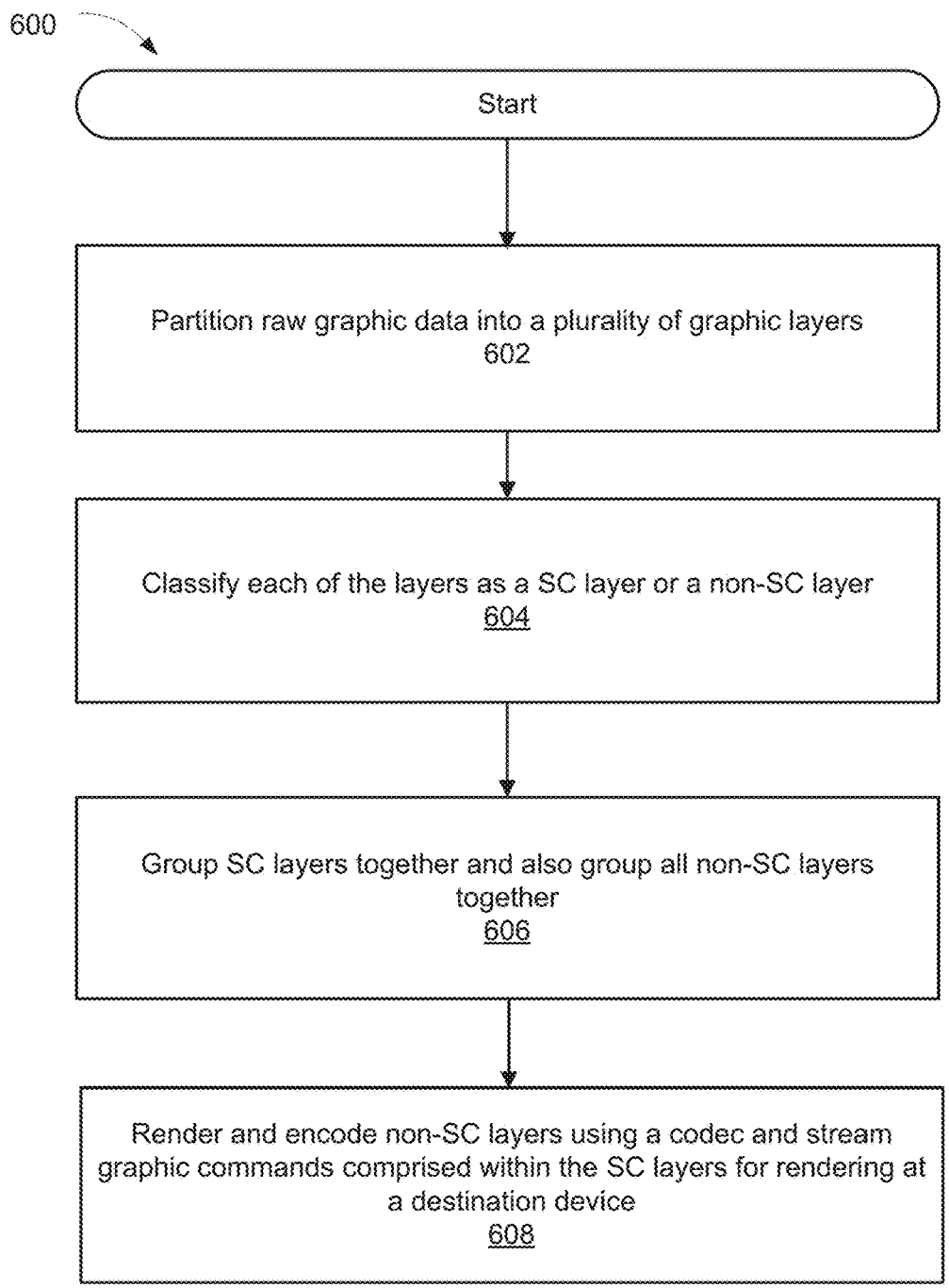
FIG. 6 depicts a flowchart illustrating an exemplary computer-implemented process for efficiently encoding an application screen using a hybrid compression methodology wherein SC layers are rendered using graphic streaming techniques in accordance with an embodiment of the present invention.

FIG. 6 depicts a flowchart 600 illustrating an exemplary computer-implemented process for efficiently encoding an application screen using a hybrid compression methodology wherein SC layers are rendered using graphic streaming techniques in accordance with an embodiment of the present invention.

At step 602, raw graphic data received from a graphics processing device or an associated memory is retrieved and partitioned into a plurality of graphic layers.

At step 604, each of the layers is classified as an SC layer or a non-SC layer using one of several methods detailed previously.

At step 606, all the SC layers are grouped together and, further, all the non-SC layers are also separately grouped together.

At step 608, the group of non-SC layers is rendered and encoded for transmission using a codec suitable to non-SC layers, e.g., conventional video codecs. Meanwhile, graphic commands comprising the group of SC layers are streamed to a destination device wherein a decoder at the destination device renders the SC layers using the graphic commands. Further, the decoder at the destination device combines the non-SC layers with the SC layers.

Figure 7:
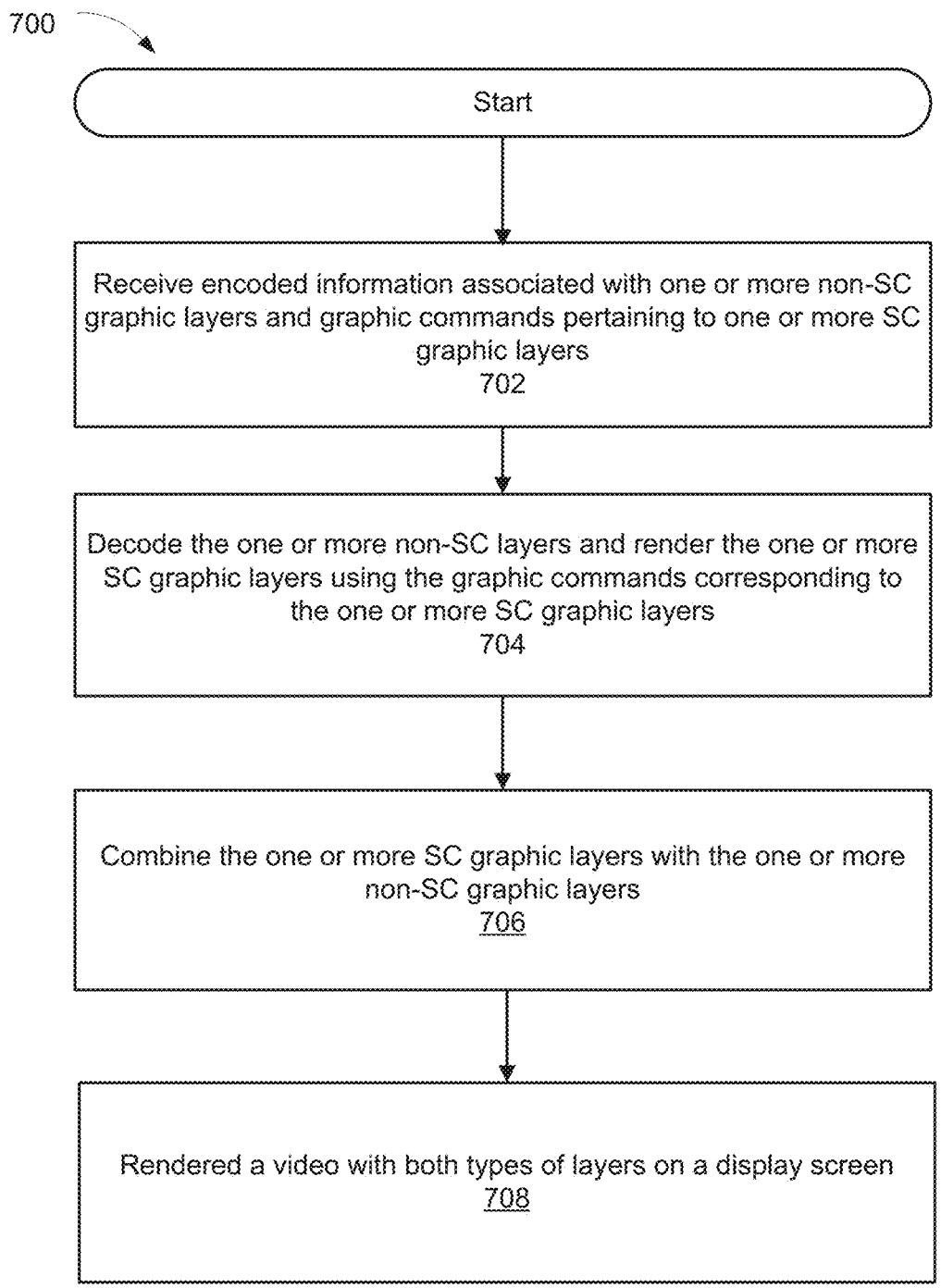
FIG. 7 depicts a flowchart illustrating an exemplary computer-implemented process for efficiently decoding an application screen using a hybrid combination of non-SC layer decoding and SC layer rendering using graphic commands techniques and combining the layers in accordance with an embodiment of the present invention.

FIG. 7 depicts a flowchart 700 illustrating an exemplary computer-implemented process for efficiently decoding an application screen using a hybrid combination of non-SC layer decoding and SC layer rendering using graphic commands techniques and combining the layers in accordance with an embodiment of the present invention.

At step 702, encoded information is received associated with one or more non-SC graphic layers. Separately, streaming graphic commands are received that characterize one or more SC layers.

At step 704, a decoder is used to decode the one or more encoded non-SC graphic layers using conventional techniques. Separately, one or more SC layers are rendered using the streamed graphics commands that correspond to the one or more SC layers.

At step 706, the one or more SC graphic layers and the one or more non-SC graphic layers are combined by using one of several methodologies, e.g., alpha blending.

At step 708, a video is rendered using the combined SC and non-SC graphic layers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A computer-implemented method of encoding a screen frame of an application, the method comprising:
   partitioning graphic data of the screen frame into a plurality of graphic layers;
   classifying each of the plurality of graphic layers as either a screen content (SC) layer or a non-screen content (non-SC) layer, wherein the SC layer comprises computer-generated video content and wherein the non-SC layer comprises natural video content, wherein the classifying comprises identifying the one or more SC layers and the one or more non-SC layers of the plurality of graphic layers based on rendering commands associated with respective layers of the plurality of graphic layers, wherein the rendering commands are particular to a type of layer of the plurality of graphic layers;
   rendering and encoding one or more SC layers of the plurality of graphic layers using a first codec and rendering and encoding one or more non-SC layers of the plurality of graphic layers using a second codec; and
   transmitting the one or more SC layers and the one or more non-SC layers to a destination device, wherein the one or more SC layers and the one or more non-SC layers are operable to be decoded at the destination device and combined to form a rendered video frame.

2. The method of claim 1, wherein the encoding the one or more non-SC layers is performed using encoding techniques including H.264, HEVC, and VC1.

3. The method of claim 1, wherein the encoding the one or more SC layers is performed using encoding techniques including Portable Network Graphics (PNG), HEVC-SCC extension, and Quick-time animation.

4. The method of claim 1, wherein the classifying comprises:
   identifying the one or more SC layers and the one or more non-SC layers of the plurality of graphic layers using machine learning methods.

5. The method of claim 4, wherein the machine learning methods are selected from a group including support vector machines, Bayesian machine learning, deep neural network, convolutional neural networks (CNNs), deep belief networks, deep learning, and artificial neural networks.

6. The method of claim 1, wherein the classifying comprises:
identifying the one or more SC layers and the one or more non-SC layers of the plurality of graphic layers based on characteristics associated with respective layers of the plurality of graphic layers.

7. The method of claim 1, wherein the one or more SC layers and the one or more non-SC layers are combined using alpha blending.

8. A system for performing a method of encoding a screen frame of an application, the system comprising:
a memory; and
a processing device communicatively coupled with the memory and the processing device configured to:
partition graphic data of the screen frame into a plurality of graphic layers;
classify each of the plurality of graphic layers as either a screen content (SC) layer or a non-screen content (non-SC) layer, wherein the SC layer comprises computer-generated video content and wherein the non-SC layer comprises natural video content, wherein to classify each of the plurality of graphic layers, the processing device is further configured to identify the one or more SC layers and the one or more non-SC layers of the plurality of graphic layers based on rendering commands associated with respective layers of the plurality of graphic layers, wherein the rendering commands are particular to a type of layer of the plurality of graphic layers;
group one or more SC layers into a first group and group one or more non-SC layers into a second group;
render and encode the first group using a first codec to produce an encoded first group and render and encode the second group using a second codec to produce an encoded second group;
transmit the encoded first group and the encoded second group to a destination device, wherein the encoded first group and the encoded second group are operable to be decoded at the destination device with respective decoders and combined to form a rendered video frame.

9. The system of claim 8, wherein the encoded second group is encoded using encoding techniques including H.264, HEVC, and VC1.

10. The system of claim 8, wherein the encoded first group is encoded using encoding techniques including Portable Network Graphics (PNG), HEVC-SCC extension, and Quick-time animation.

11. A non-transitory computer-readable storage medium having stored thereon, computer executable instructions that, if executed by a computer system cause the computer system to perform a method of encoding a screen frame of an application, the method comprising:
partitioning graphic data of the screen frame into a plurality of graphic layers;
classifying each of the plurality of graphic layers as either a screen content (SC) layer or a non-screen content (non-SC) layer, wherein the SC layer comprises computer-generated video content and wherein the non-SC layer comprises natural video content, wherein the classifying comprises identifying the one or more SC layers and the one or more non-SC layers of the plurality of graphic layers based on rendering commands associated with respective layers of the plurality of graphic layers, wherein the rendering commands are particular to a type of layer of the plurality of graphic layers;
rendering and encoding one or more non-SC layers of the plurality of graphic layers using a codec to produce an encoded one or more non-SC layers;
transmitting the encoded one or more non-SC layers to a destination device;
streaming rendering commands associated with the one or more SC layers to the destination device, and
wherein the encoded one or more non-SC layers are operable to be decoded at the destination device, and wherein the one or more SC layers are operable to be rendered at the destination device using the rendering commands.

12. The non-transitory computer-readable storage medium of claim 11, wherein the decoded one or more non-SC layers and the rendered one or more SC layers are operable to be combined to form a rendered video frame at the destination device.

13. The non-transitory computer-readable storage medium of claim 12, wherein the rendering and encoding the one or more non-SC layers is performed using encoding techniques including H.264, HEVC, and VC1.

14. The non-transitory computer-readable storage medium of claim 11, wherein the rendering commands include Open Graphics Library (OpenGL) and DirectX commands.

* * * * *